US009687742B2

(12) United States Patent
Sprague et al.

(10) Patent No.: US 9,687,742 B2
(45) Date of Patent: Jun. 27, 2017

(54) APPARATUS, SYSTEM, AND METHOD FOR IN-GAME STATISTICS ENTRY AND ANALYSIS

(71) Applicant: Court Intelligence Holdings, LLC, Layton, UT (US)

(72) Inventors: Jordan Sprague, Layton, UT (US); Cameron Pribble, Clinton, UT (US); Chad Sims, Kaysville, UT (US); Ryan Smith, Kaysville, UT (US)

(*) Notice: Subject to any disclaimer, the term of this patent is extended or adjusted under 35 U.S.C. 154(b) by 214 days.

(21) Appl. No.: 14/546,959

(22) Filed: Nov. 18, 2014

(65) Prior Publication Data

US 2015/0141144 A1    May 21, 2015

Related U.S. Application Data

(60) Provisional application No. 61/905,710, filed on Nov. 18, 2013.

(51) Int. Cl.
| | | |
|---|---|---|
| *G06F 17/00* | (2006.01) | |
| *A63F 13/58* | (2014.01) | |
| *A63F 13/816* | (2014.01) | |
| *G06Q 10/06* | (2012.01) | |
| *G06F 17/30* | (2006.01) | |
| *A63F 13/65* | (2014.01) | |
| *A63F 13/812* | (2014.01) | |

(52) U.S. Cl.
CPC ............ *A63F 13/58* (2014.09); *A63F 13/816* (2014.09); *G06F 17/30* (2013.01); *G06Q 10/0631* (2013.01); *G06Q 10/06398* (2013.01); *A63F 13/65* (2014.09); *A63F 13/812* (2014.09)

(58) Field of Classification Search
USPC .......................................... 463/16–25, 30–33
See application file for complete search history.

(56) References Cited

U.S. PATENT DOCUMENTS

| | | | | |
|---|---|---|---|---|
| 6,546,400 | B1* | 4/2003 | Aberson | A63F 13/10 |
| 2007/0238507 | A1* | 10/2007 | Sobel | G07F 17/32 |
| | | | | 463/17 |
| 2015/0148129 | A1* | 5/2015 | Austerlade | H04L 43/04 |
| | | | | 463/31 |
| 2015/0375083 | A1* | 12/2015 | Stelfox | A63B 71/06 |
| | | | | 700/91 |

\* cited by examiner

*Primary Examiner* — Ronald Laneau
(74) *Attorney, Agent, or Firm* — Kunzler Law Group, PC

(57) ABSTRACT

Described herein is a method for in-game statistics entry and analysis that includes sequentially displaying a plurality of statistical data entry requests in a logical game flow order on a graphical user interface, and receiving data for each of the plurality of statistical data entry requests via the graphical user interface. Each data entry request is not displayed until data is received for a preceding statistical data entry request.

5 Claims, 14 Drawing Sheets

US 9,687,742 B2

APPARATUS, SYSTEM, AND METHOD FOR IN-GAME STATISTICS ENTRY AND ANALYSIS

CROSS-REFERENCE TO RELATED APPLICATION

This application claims the benefit of U.S. Provisional Patent Application No. 61/905,710, filed Nov. 18, 2013, which is incorporated herein by reference.

FIELD

This application relates generally to data entry and analysis, and more particularly to entering and analyzing game statistics during a game.

BACKGROUND

Tracking and analyzing statistics associated with participants in athletic events may be helpful for coaches, trainers, and fans alike. Often, statistics concerning an athletic event are captured while the athletic event is in progress. Some conventional devices and/or applications are available to enter and analyze statistics associated with athletic events.

SUMMARY

The subject matter of the present application has been developed in response to the present state of the art, and in particular, in response to the problems and needs of conventional statistics entry and analysis applications for athletic competitions. Generally, the subject matter of the present application has been developed to provide a method and apparatus for in-game statistics entry and analysis that overcomes at least some of the above-discussed shortcomings of the prior art.

According to one embodiment, a method for in-game statistics entry and analysis includes sequentially displaying a plurality of statistical data entry requests in a logical game flow order on a graphical user interface, and receiving data for each of the plurality of statistical data entry requests via the graphical user interface. Each data entry request is not displayed until data is received for a preceding statistical data entry request.

In one implementation of the method, the plurality of statistical data entry requests are displayed non-concurrently. According to yet one implementation of the method, the logical game flow order includes a plurality of results occurring during an athletic competition, where each result logically follows from a previous result. In an implementation of the method, each statistical data entry request of the plurality of statistical data entry requests is displayed in place of a previously displayed statistical data entry request of the plurality of statistical data entry requests.

According to some implementations of the method, each statistical data entry request requests a selection of at least one result of at least two possible results of one of a plurality of result sets. Each statistical data entry request can be associated with a different result set of the plurality of result sets. The plurality of result sets can include an in-game roster result set, an offensive possession result set, a defensive result set, a play-type result set, a play result set, and a player result set.

In certain implementations of the method, the plurality of statistical data entry requests includes a request for selection of active players in a game, a request for selection of an offensive or defensive possession, a request for selection of a first play type, a request for selection of a first result of the first play type, and a request for selection of a first player corresponding with the first result of the first play type. The method sequentially displays, in order, the request for selection of active players in a game, the request for selection of an offensive or defensive possession, the request for selection of a first play type, the request for selection of a first result of the first play type, and the request for selection of a first player corresponding with the first result of the first play type. The plurality of statistical data entry requests may further include a request for selection of a second result of the first play type, and a request for selection of a second player corresponding with the second result of the first play type. After sequentially displaying the request for selection of active players in a game, the request for selection of an offensive or defensive possession, the request for selection of a first play type, the request for selection of a first result of the first play type, and the request for selection of a first player corresponding with the first result of the first play type, the method sequentially displays, in order, the request for selection of a second result of the first play type, and the request for selection of a second player corresponding with the second result of the first play type.

According to some implementations, the method further includes determining a group plus/minus efficiency rating for each distinct group of players that played in a game based on the data for each of the plurality of statistical data entry requests received via the graphical user interface.

In certain implementations, the method also includes determining a combination of players with the highest group plus/minus efficiency rating based on the data for each of the plurality of statistical data entry requests received via the graphical user interface. The combination of players are selected from players that played in a game. The method may also include determining an efficiency of at least one play executed in a game for the combination of players with the highest group plus/minus efficiency rating. In one implementation, the combination of players with the highest group plus/minus efficiency rating did not play together as a group in the game. The method may include recommending via the graphical user interface the combination of players with the highest group plus/minus efficiency rating for playing together as a group in the game.

According to another embodiment, a method for in-game statistics entry and analysis includes selecting, using a handheld electronic device, players that are or will be playing together as groups in an athletic competition, selecting, using the handheld device, one of offense or defense, and selecting, using the handheld device, a play of a plurality of plays associated with the selected one of offense or defense. The method also includes displaying only a first set of results associated with the selected play of the plurality of plays, and selecting, using the handheld device, a result from the first set of results. Additionally, the method includes displaying only a second set of results if the selected result from the first set of results is a first result of the first set of results, and displaying only a third set of results if the selected result from the first set of results is not a first result of the first set of results. The method may further include determining a group plus/minus efficiency metric for each of the groups that played together in the athletic competition based at least partially on the result selected from the first set of results. Also, the method may include determining a combination of players who played in the athletic competition that if grouped together in the athletic competition would have the highest group plus/minus efficiency metric based at least partially on the result selected from the first set of results.

In some implementations, the method further includes determining offensive play efficiencies and defensive play efficiencies for the combination of players who played in the athletic competition that if grouped together in the athletic competition would have the highest group plus-minus efficiency metric.

According to certain implementations of the method, the group plus/minus efficiency metric for each of the groups that played together in the athletic competition, and the combination of players who played in the athletic competition that if grouped together in the athletic competition would have the highest group plus/minus efficiency metric based at least partially on the result selected from the first set of results, are determined in real-time during the athletic competition.

In various implementations, the method further includes selecting, using the handheld device, a result from the second set of results if the selected result from the first set of results is a first result of the first set of results, and selecting, using the handheld device, a result from the third set of results if the selected result from the first set of results is not a first result of the first set of results. Also, the method includes displaying only a fourth set of results if the selected result from second set of results is a first result of the second set of results, displaying only a fifth set of results if the selected result from the second set of results is not a first result of the second set of results, displaying only a sixth set of results if the selected result from third set of results is a first result of the third set of results, and displaying only a seventh set of results if the selected result from the third set of results is not a first result of the third set of results.

According to certain implementations of the method, the first set of results includes made field goal, missed field goal, blocked field goal, turnover, foul, out of bounds, and possession reset.

In yet another embodiment, an apparatus for in-game statistics entry and analysis includes a game flow module configured to request statistical data entry during a game, an interface module configured to sequentially and non-concurrently display statistical data entry requests during a game using a graphical user interface, and an analysis module configured to generate a report comprising a combination of players with a desirable group plus/minus efficiency metric, and an efficiency of each play of a plurality of plays for the combination of players with the desirable group plus/minus efficiency metric.

In certain embodiments, the modules of the apparatus described herein may each include at least one of logic hardware and executable code, the executable code being stored on one or more memory devices. The executable code may be replaced with a computer processor and computer-readable storage medium that stores executable code executed by the processor.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. For example, numerous specific details are provided, such as examples of programming, software modules, user selections, network transactions, database queries, database structures, hardware modules, hardware circuits, hardware chips, etc. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
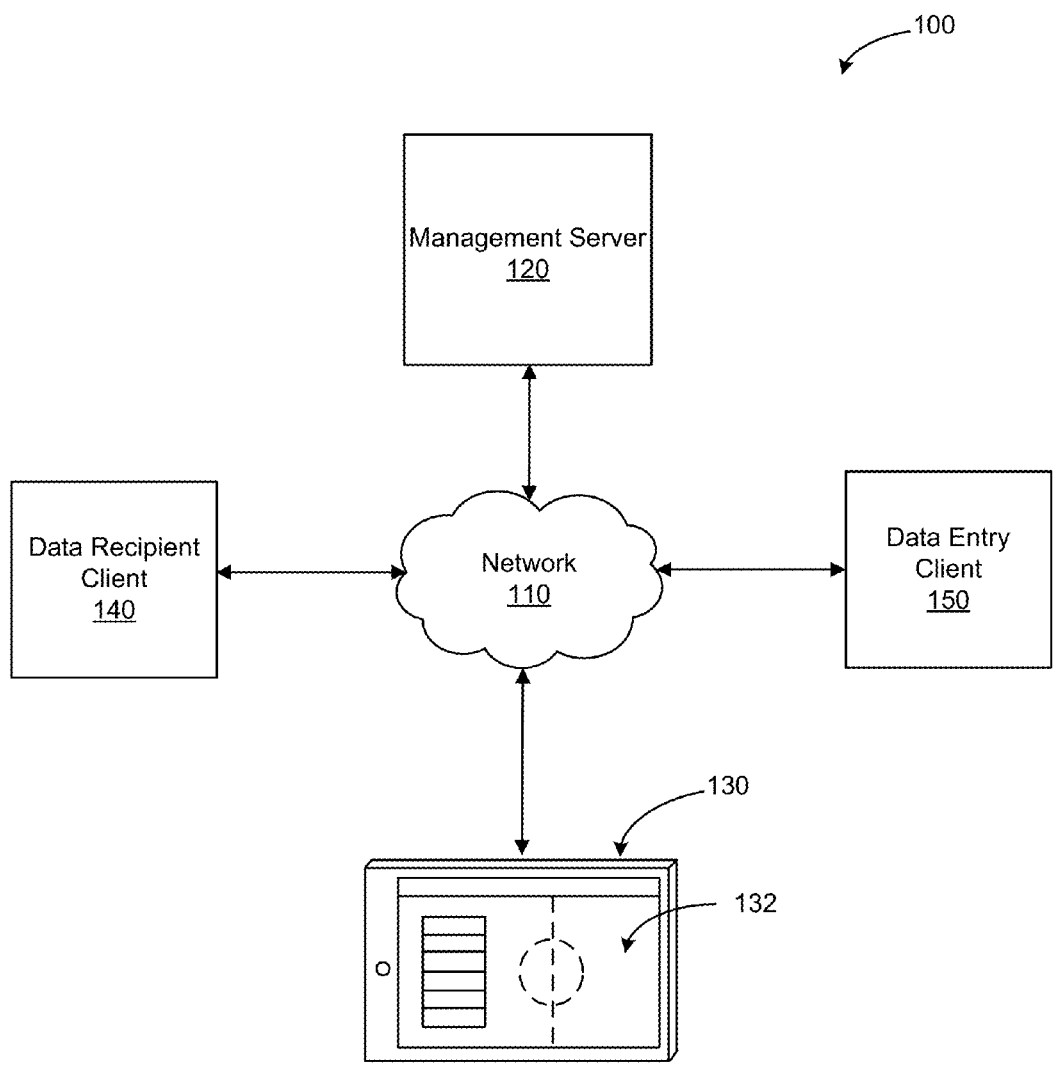
FIG. 1 is a schematic block diagram illustrating one embodiment of a system for in-game statistic entry and analysis.

FIG. 1 depicts one embodiment of a system 100 for in-game statistic entry and analysis. The system 100 includes a network 110, a management server 120, a first data entry client 130, a data recipient client 140, and a second data entry client 150. Generally, the system 100 facilitates a game flow data entry process for in-game use that analyzes entered statistical data to provide real-time group efficiency reports, as well as personnel and play recommendations.

Conventional in-game statistic entry systems suffer from several drawbacks. For example, conventional systems include a data entry interface that includes multiple data entry points simultaneously visible to a user. The user must determine the category or type of data to be entered and find the corresponding data entry point on a graphical user interface. With multiple data entry points present on a single graphical user interface, finding a desired data entry point can be difficult and promote data entry errors. Additionally, conventional in-game statistic entry systems do not actively prompt a user to enter specific categories or types of data during a game. Rather, the user of conventional systems is left to his own resources to determine and/or remember which of a variety of categories of data should be entered. Even the best of data entry users will forget to enter all desired or necessary categories of data without actively prompting the user for such data. Further, even if some conventional systems may prompt a user to enter data of a particular category, such prompting is either passive, or does not prompt the user in a logical game flow order. Also, conventional systems may analyze statistical data and provide reports that include such statistical metrics, such as the plus/minus metric for each player. However, the statistical metrics provided in conventional reports may only be generated after games are played, and thus may be limited in their usefulness to assist coaches (and others) with personnel and game strategy decisions, particularly while games are being played.

The system 100 of the present disclosure rectifies at least some of the drawbacks of conventional systems. For example, according to some embodiments, a data entry interface of the system 100 includes only a single data entry point at a time during a game. In yet certain embodiments, the system 100 actively prompts a user to enter specific categories of data in a logical game flow order. According to one implementation, a logical game flow order can be defined as the order of a plurality of sequential results occurring during a game (e.g., athletic competition), where each result logically follows from or is a consequence of a previous result (e.g., a directly preceding result). Further, according to some embodiments, the system 100 analyzes game flow data in real-time and can provide real-time reports with useful statistical metrics, such as group or combination plus/minus metrics, as well as best player combinations and associated play efficiencies.

The first data entry client 130 includes a graphical user interface 132 that communicates information to a user, requests information from a user, and receives information from the user. Generally, the information is related to an athletic event, such as a sporting game between two opposing teams. The first data entry client 130 may display information regarding the athletic event, such as real-time statistics and reports, and prompts a user to enter data associated with specific plays during the athletic event. Additionally, the first data entry client 130 may be configured to generate the real-time statistics and reports based on the data entered by the user during the athletic event. Accordingly, in certain implementations, the first data entry client 130 can be a stand-alone, self-contained device that operates to provide in-game statistics entry and analysis without input from or communication with other devices, such as servers and clients.

Alternatively, in some implementations, the first data entry client 130 may receive input from or communicate with other devices via the network 110 of the system 100. Although the first data entry client 130 may be configured to independently receive and analyze data from a user, and generate statistical reports as will be described in more detail below, it may be desirable to communicate with other devices in the system 100. For example, in one implementation, the first data entry client 130 may communicate with other data entry clients, such as the second data entry client 150, to share data and user inputs and/or statistical reports. In yet some implementations, the first data entry client 130 may communicate with data recipient clients, such as the data recipient client 140 to provide statistical data and reports for viewing on the data recipient clients. According to certain implementations, the management server 120 may facilitate the communications of the various clients of the system 100 over the network 110. Additionally, the management server 120 may generate statistical data and reports based on user input received from one or more data entry clients, or store statistical data and reports generated by and received from one or more data entry clients.

The network 110 may be embodied as a global communications network such as the Internet, a Local Area Network ("LAN"), multiple LANs communicating over the internet, a Wireless Local Area Network ("WLAN"), a mobile telecommunications network such as a 3G or 4G network, or any other suitable communications network.

The management server 120, and each of the data entry clients 130, 150 and data recipient client 140, may be embodied as computing devices having memory, a storage device storing computer readable programs, and a processor that executes the computer readable programs as is known to those skilled in the art. In some implementations, each of the clients 130, 140, 150 may be a personal desktop assistant ("PDA"), a tablet computer, a slate computer, an e-Book reader, a mobile computing device, a smartphone, a desktop computer, a portable computer, a laptop computer, a server, a mainframe computer, or the like. Moreover, each client may include one or more platform access tools, such as web browsers, web applications, and the like, that allow users access to an in-game statistic entry and analysis platform. The in-game statistic entry and analysis platform refers to logic, software code, and the like to facilitate the features of the system 100 and data entry client 130 described herein. The platform may be embodied by a competition management website accessible by a web browser. In one embodiment, the platform may be accessible by mobile devices through applications executing on the mobile devices. The website or application provided by the in-game statistic entry and analysis platform may be embodied as one or more application or web pages available for access over the network 110. Each application or web page may include software code, images, and text as is known in the art. Specifically, each application or web page may include static and/or dynamic elements and include Hypertext Markup Language ("HTML") code, JavaScript code, Flash animations, and the like. The in-game statistic entry and analysis platform can be provided by the data entry client 130 and/or hosted on one or more management servers 120. In other embodiments, the in-game statistic entry and analysis platform may exist as a plug-in or be otherwise integrated with an existing social networking or other website accessible by the data entry client 130.

Figure 2:
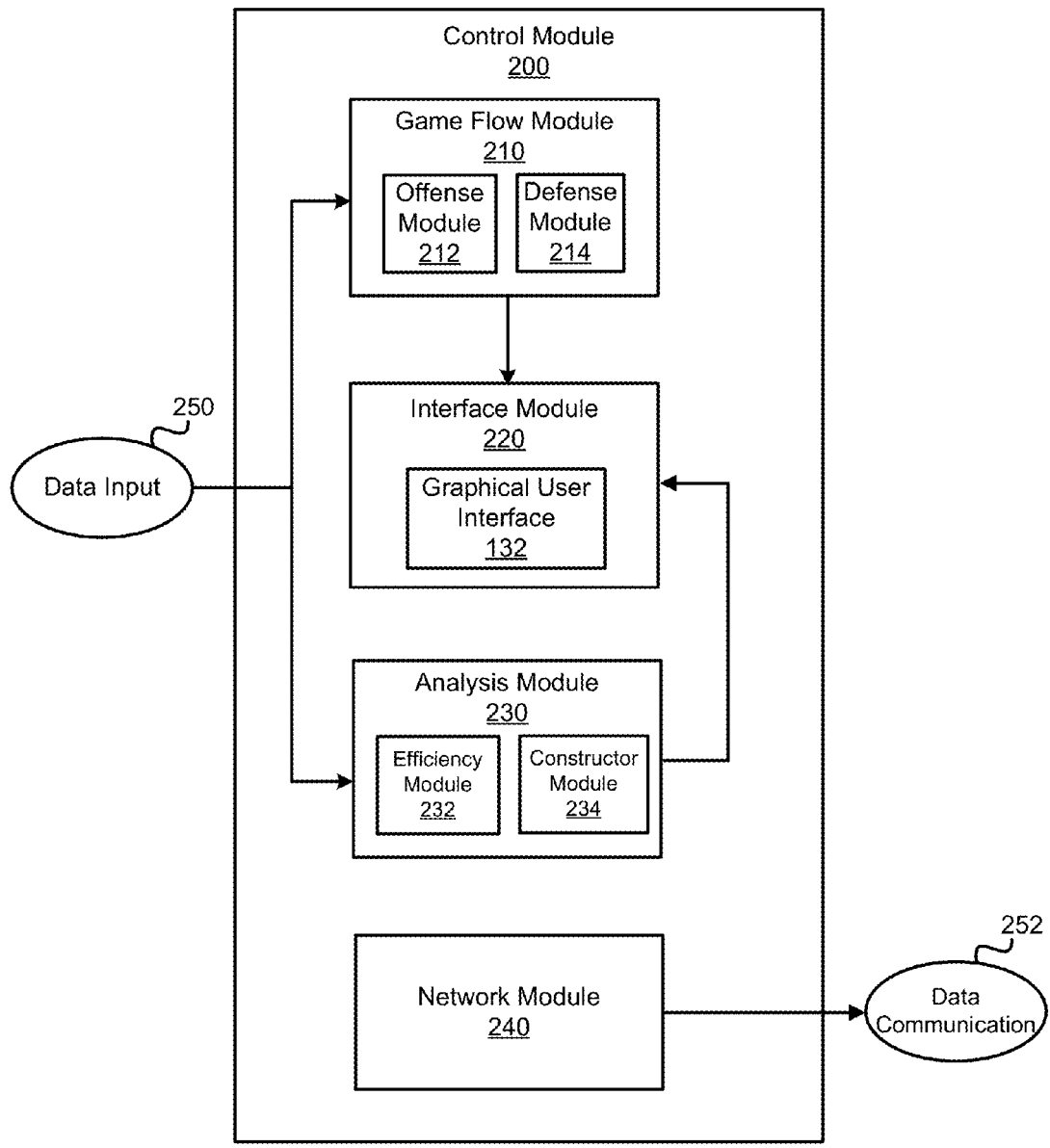
FIG. 2 is a schematic block diagram illustrating one embodiment of a control module of a data entry client.

Referring to FIG. 2, and according to one embodiment, the data entry client 130 includes a control module 200. In the illustrated implementation, the control module 200 includes a game flow module 210, an interface module 220, an analysis module 230, and a network module 240. However, in other implementations, the control module 200 does not include the network module 240. Generally, in some embodiments, the control module 200 is configured to request data input from a user in a logical game flow order during a game, receive the requested data input from the user during the game, and generate real-time statistical reports with useful statistical metrics.

The game flow module 210 includes an offense module 212 and a defense module 214. Generally, one or both of the offense and defense modules 212, 214 is configured to determine the data to be requested for input by a user, and based on the data input 250 entered in response to the request, determine additional data to be requested for input by the user. The modules 212, 214 communicate the data to be requested to a display module 390 of the game flow module 210 (see, e.g., FIG. 4). The display module 390 generates a display command 492 representing the data to be requested. The display command 492 is received by the interface module 220, which updates the graphical user interface 132 based on the display command.

Figure 3:
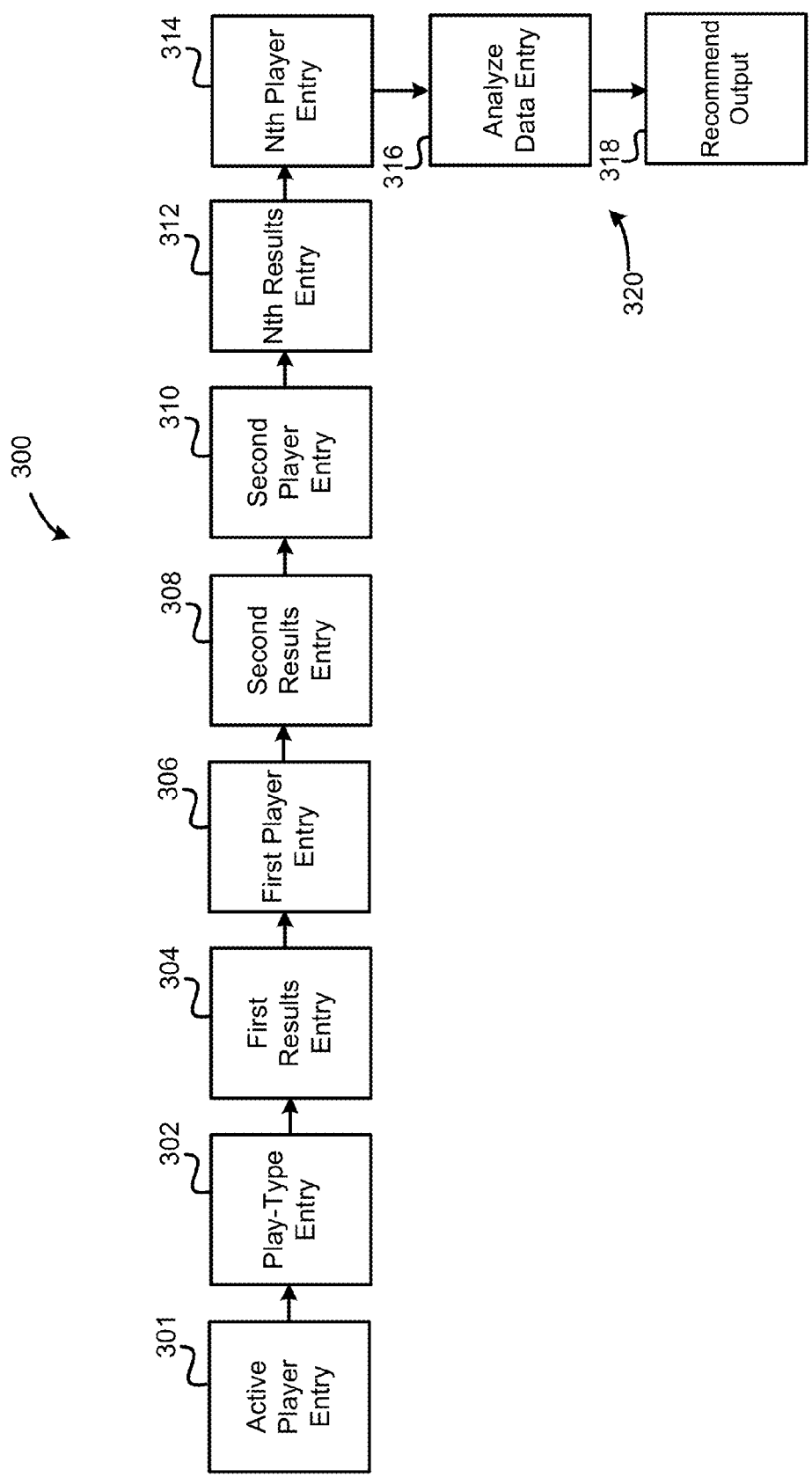
FIG. 3 is a schematic flow diagram illustrating one embodiment of a data request process that follows a logical game flow order.

Referring to FIG. 3, the game flow module 210 is configured to execute a data request process 300 following a logical game flow order. Each action of the data request process 300 can represent one of a data input request, an analysis action, or output action. The actions 301-314 represent respective data input requests sequentially and non-concurrently displayed on the graphical user interface 132. Each data input request includes a data entry point accessible by a user to enter one of at least two results. Generally, the data input request of an action is not displayed unless the immediately preceding action has been completed (e.g., the user has entered data acquiescing to data input request of the preceding action). The entered results are communicated as data input 250 back to the game flow module 210 and the analysis module 230.

Figure 8:
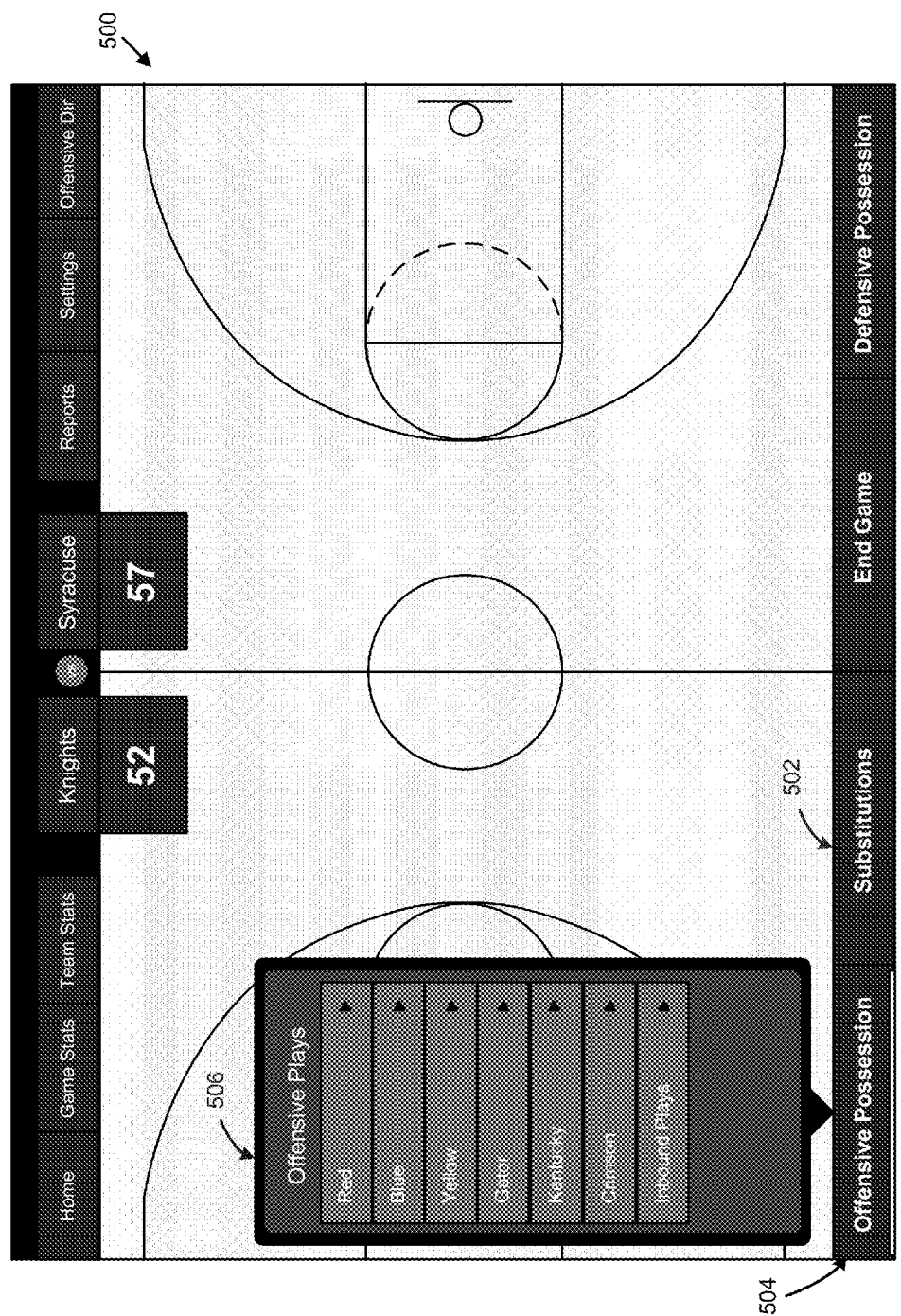
FIGS. 8-14 are depictions of various embodiments of screenshots of a graphical user interface of a data entry client.

The game flow module 210 executes the process 300 by first commanding the interface module 220 (e.g., via a display command 492 generated by a display module 390 of the game flow module) to request a user to enter the active players in the game at 301. The active player entry request 301 (e.g., data entry point) can be displayed on a graphical user interface for entry by a user at any of various times during a game. For example, at the start of a game, the active player entry request 301 may prompt the user to enter all the players who are starting the game. Similarly, at the start of each subsequent quarter or half, the active player entry request 301 may prompt the user to enter all the players who are starting the quarter or half, or following a time-out. In some implementations, when a substitution of one or more players is made during a quarter or half, the user may enter the substituting player replacing the player being substituted via the active player entry request 301. Alternatively, as shown in FIG. 8, a screenshot of a graphical user interface 500 includes a substitution data entry point 502 not part of the logical game flow order.

In one implementation, once all active players are entered or known, the game flow module 210 commands (e.g., via the display command 492) the interface module 220 to remove the active player entry request 301 from the graphical user interface 132 and effectively replace it with a play-type entry request 302. In another implementation, once all active players are entered or known, the game flow module 210 commands (e.g., via the display command 492) the interface module 220 to display the play-type entry request 302. Although not shown in FIG. 3 as such, the play-type entry request 302 can be divided into two separately and sequentially displayed requests. For example, a first play-type entry request can be displayed for entry of one of OFFENSE or DEFENSE. As shown in FIG. 8, the first play-type entry request can be a separate data entry point 504 not part of the logical game flow order. The user may enter (e.g., select) the appropriate selection corresponding with whether his team of interest is running an offensive or defensive possession.

After the first play-type entry request has been entered by the user, the game flow module 210 commands (e.g., via the display command 492) the interface module 220 to remove the first play-type entry request and replace it with a second play-type entry request, or simply display the second play-type entry request if the first play-type entry request is not part of the logical game flow order. The second play-type entry request can be displayed for entry of one of two or more specific type of offensive plays or defensive plays depending on which of OFFENSE or DEFENSE was selected for the first play-type entry request. For example, as shown in FIG. 8, if OFFENSE was selected, then the second play-type entry request (e.g., second play-type entry request 506) may display a plurality of offensive plays or schemes. The offensive play of the plurality of offensive plays that is being run, or will be run, on the given offensive possession is then selected by the user to satisfy the second play-type entry request. In contrast, if DEFENSE was selected, then the second play-type entry request may display a plurality of defensive plays or schemes. The defensive play of the plurality of defensive plays that is being run, or will be run, on the given defensive possession is then selected by the user to satisfy the second play-type entry request. As can be recognized, the play selections or options from the second play-type entry request cannot be selected until the type of possession from the first play-type request is selected. By displaying the second play-type request only after the first play-type request is satisfied, a logical game flow order of data entry is facilitated.

Figure 9:
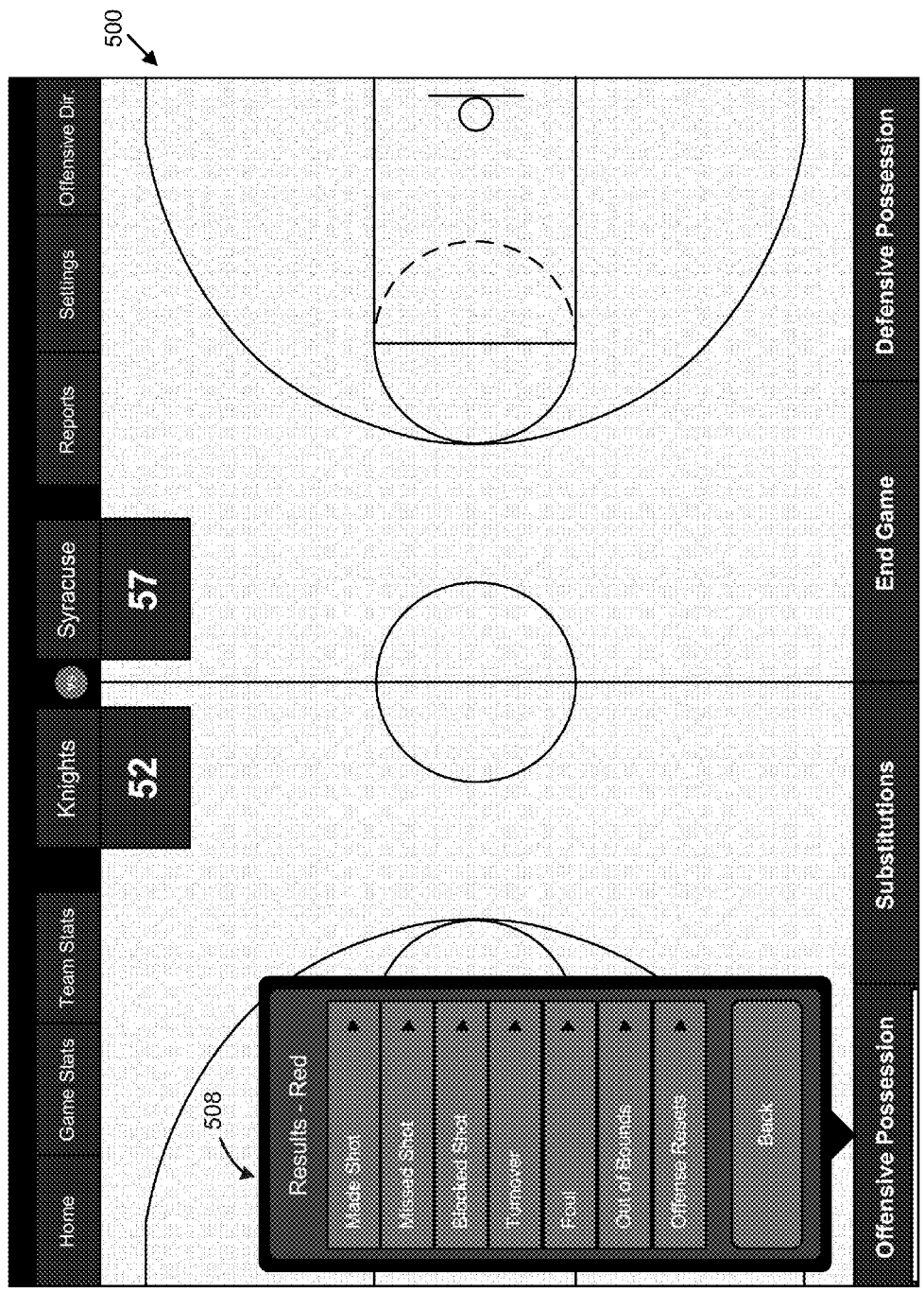

When the second play-type entry request is satisfied, the game flow module 210 commands (e.g., via the display command 492) the interface module 220 to remove the second play-type entry request and replace it with a first results entry request 304, or simply display the first results entry request. The first results entry request 304 is displayed on the graphical user interface 132 and prompts the user to enter one of two or more possible results stemming from the actual execution of the play-type selected from the second play-type request. For example, as shown in FIG. 9, if the offensive play RED was selected, then the first results entry request (e.g., first results entry request 508) may display a plurality of possible results of running the offensive play RED. The actual result of the selected offensive play is then selected by the user to satisfy the first results entry request 508. The possible results of the first results entry request 304 are associated with the particular sport or game being played. For example, as shown in FIG. 9, for basketball, the possible results of an offensive play may include, but are not limited to, or include all of, a made shot, a missed shot, a blocked shot, a turnover, a foul, the ball going out of bounds, an offensive reset, etc. Of course, for other sports, the first results entry request 304 will include other different or similar results as desired.

Figure 10:
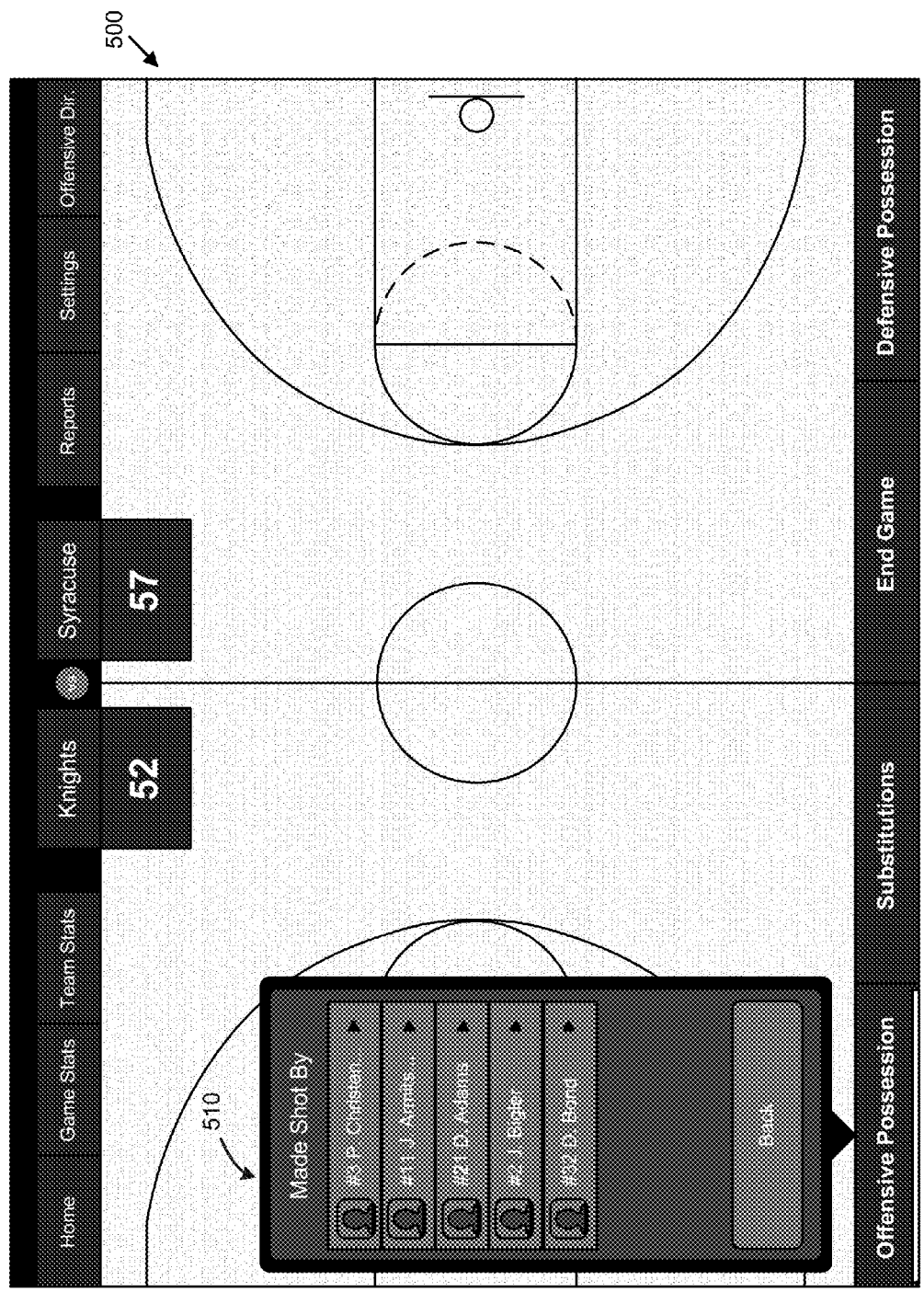
Figure 11:
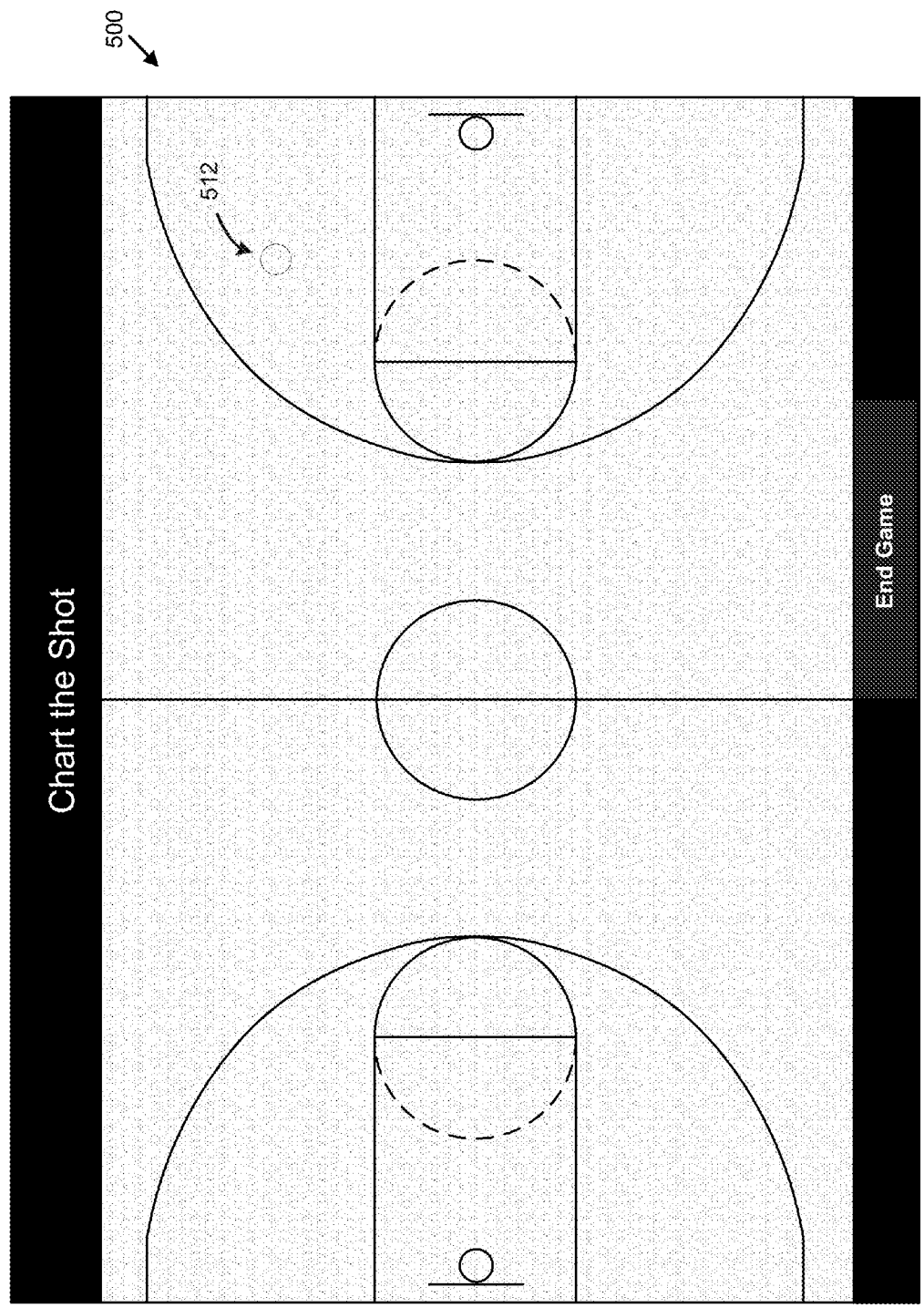

When the first results entry request 304 is satisfied, the game flow module 210 commands (e.g., via the display command 492) the interface module 220 to remove the first results entry request 304 and replace it with either a first player entry request 306 or a second results entry request 308. When the result selected for the first results entry request 304 is associated with the action of a particular player, the first player entry request 306 is displayed on the graphical user interface 132 and prompts the user to enter one or more of current or active team members in the game effectuating the selected result. For example, as shown in FIG. 10, if MADE SHOT was selected for the first results entry request 508, then the first player entry request 510 displays all the team members in the game. The player making the actual result of the selected result is then selected by the user to satisfy the first player entry request 510. As a follow-up data entry request, in some implementations, the location on the field or court of play of the selected result for the first results entry request 304 is then requested and entered by the user. For example, as shown in FIG. 11, a user may indicate the position of the actual made shot 512. Should the result selected for the first results entry request 304 not be associated with an individual player, such as a ball going out of bounds or a result requiring further information, such as a foul (e.g., is the foul an offensive or defensive foul), the game flow module 210 may skip the first player entry 306 and instead display the second results entry request 308 instead of the first player entry. Accordingly the second results entry request 308 can be displayed by the interface module 220 directly in response to either satisfaction of the first results entry 304 or the first player entry 306.

Figure 12:
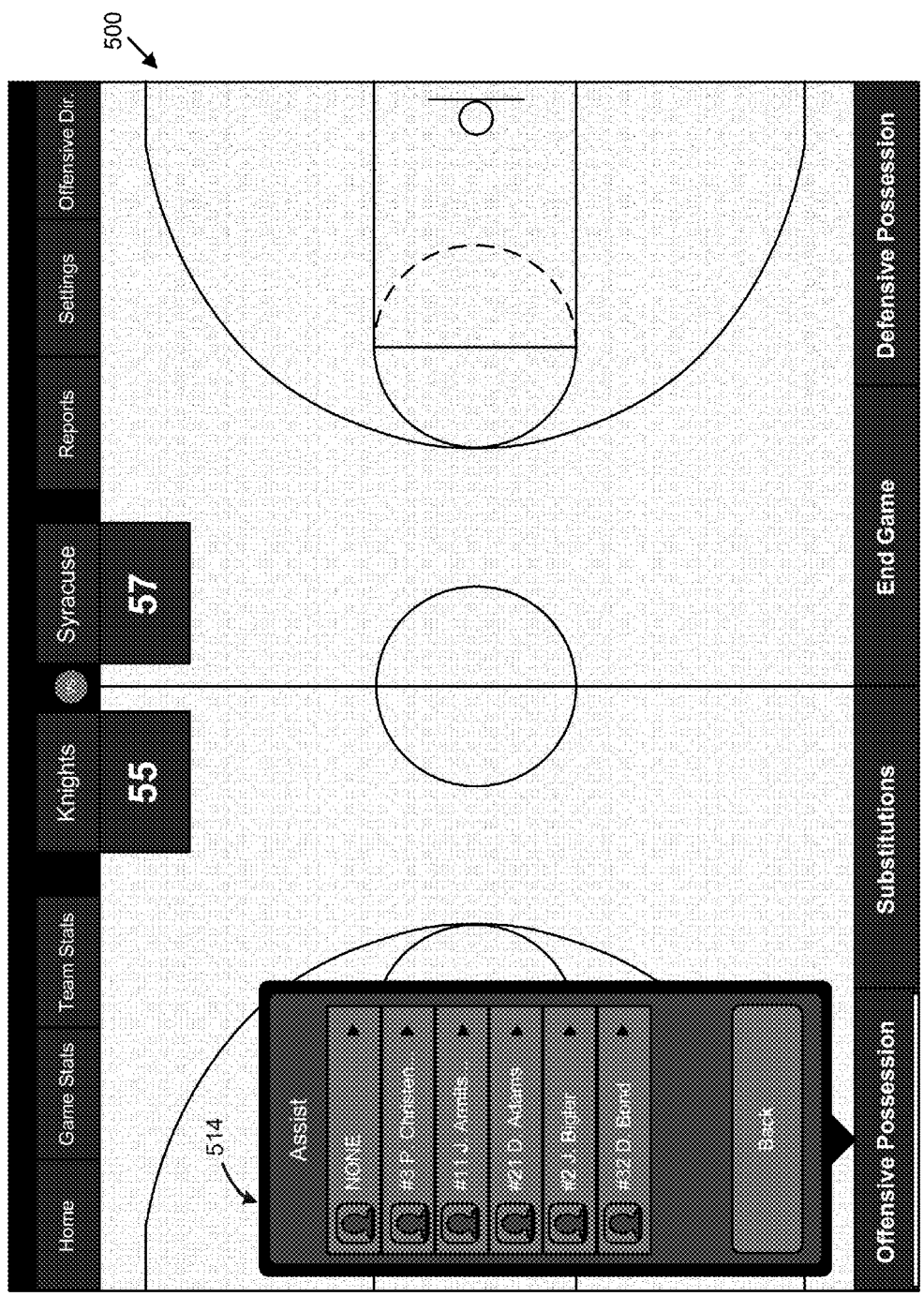

The second results entry request 308 prompts a user to enter one of a plurality of possible results associated with the selected result from the first results entry request 304. For example, referring to the basketball embodiment of FIG. 12, because MADE SHOT was selected for the first results entry request 508, the second results entry request 514 prompts the user to enter a player on the team who assisted the made shot, or enter none if no assist was attributable to a player. However, if MISSED SHOT was selected for the first results entry request 508, then the second results entry request may prompt the user to enter one of another set of results associated with missed shots, such as, for example, defensive rebound, offensive rebound, ball going out of bounds, and foul.

Should the result selected for the second results entry request 308 be associated with the action of a particular player, the second player entry request 310 is displayed on the graphical user interface 132 and prompts the user to enter one or more of current or active team members in the game effectuating the second selected result. However, if the result selected for the second results entry request 308 is not associated with the action of a particular player, but may cause additional results, another results entry request (e.g., the Nth results entry request 312) is displayed on the graphical user interface 132 and prompts the user to enter one or more additional results. For example, if the selected result for the second results entry request 308 is a foul, then the Nth results entry request 312 prompts the user to enter one of offensive foul or defensive foul. In the same manner as described above, should the result selected for the Nth results entry request 312 be associated with the action of a particular player, an Nth player entry request 314 is displayed on the graphical user interface 132 and prompts the user to enter one or more of current or active team members in the game effectuating the Nth selected result. However, if the result selected for the Nth results entry request 312 is not associated with the action of a particular player, but may cause additional results, another results entry request is displayed on the graphical user interface 132 and prompts the user to enter one or more additional results. For example, if the Nth result was a defensive foul, an additional results entry request may prompt a user to enter one of non-shooting foul and shooting foul.

The use of an Nth results entry request 312 and Nth players entry request 314 in the data request process 300 is used to indicate that there is no limit to the number of result entry requests or player entry requests, as long as the requests follow a logical game flow order as described above. For example, the data request process 300 would not display a fifth result entry request without displaying and satisfying a preceding first through fourth entry requests. Once a possession is completed, and no additional results or players require input, the data request process 300 ends.

Although many of the actions of the above data request process 300 and the graphical user interface 500 is described with reference to offensive players and results, the same principles apply to defensive players and results. In other words, the offensive results may be replaced with defensive results while maintaining a logical game flow order.

Following the data request process 300, a data analysis process 320 may be executed by the analysis module 230. Referring back to FIG. 2, the analysis module 230 includes an efficiency module 232 and a constructor module 234.

Figure 13:
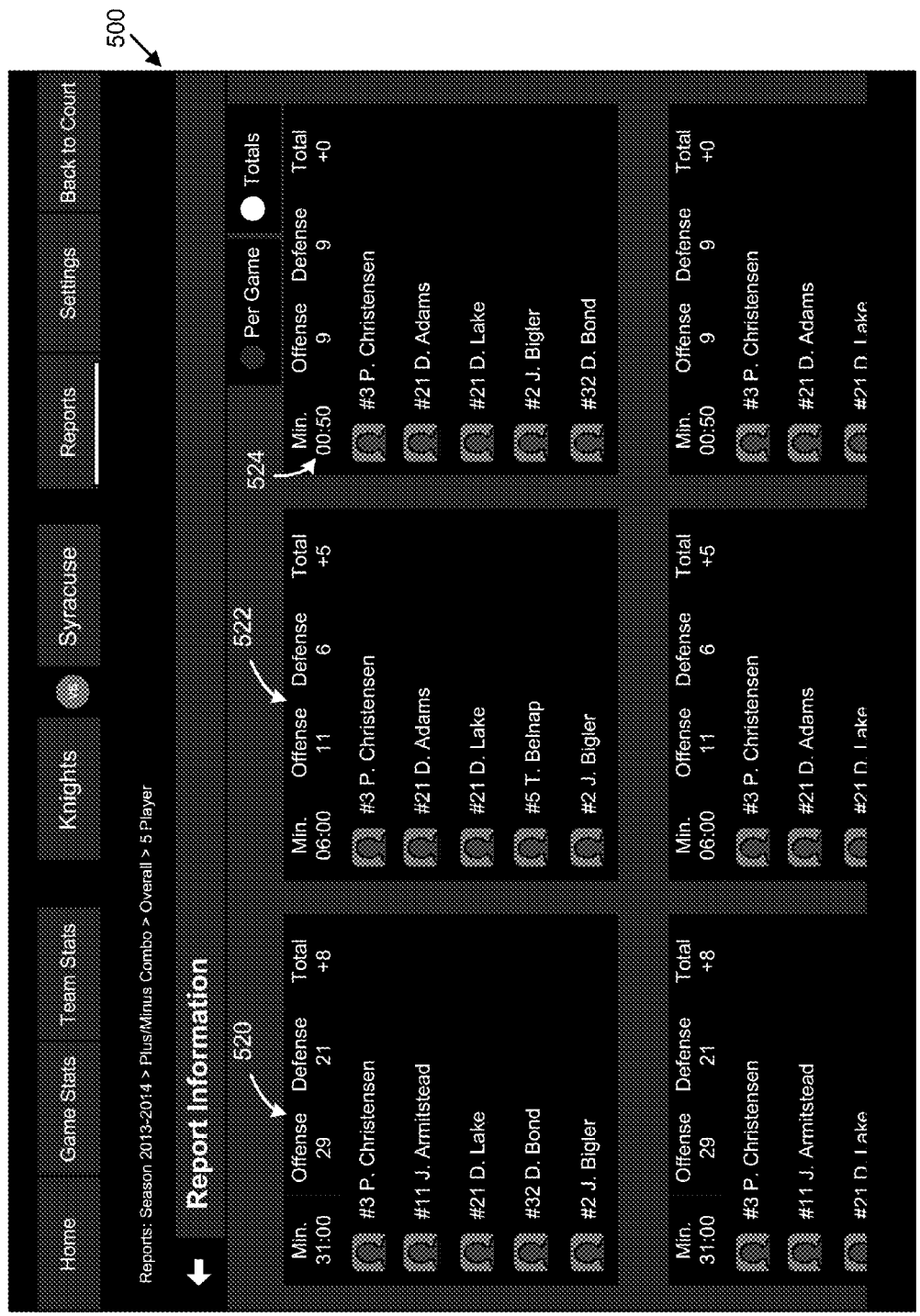

The efficiency module 232 generates a plurality of group plus/minus efficiency metrics based on the data input 250 from the data entry requests of the data request process 300. The efficiency module 232 tracks and displays the plus/minus efficiency for each distinct grouping of players that played in a game. For example, as shown in FIG. 13, the graphical user interface 500 displays a plurality of plus/minus efficiency metrics 520, 522, 524 each associated with a different grouping of players. A group of players is different than another group of players if at least one player is different between the groupings. In some implementations, the efficiency module 232 may not only calculate and display the plus/minus efficiency for each group, but may track the total minutes played, the number of offensive plays run, and the number of defensive plays run as a group. With the plus/minus efficiency metrics for a plurality of player groupings displayed simultaneously, a user may easily determine the most efficient player groupings in terms of group plus/minus efficiency. According to the foregoing, the efficiency module 232 executes the action 316 of analyzing the data entry of the data analysis process 320.

Figure 14:
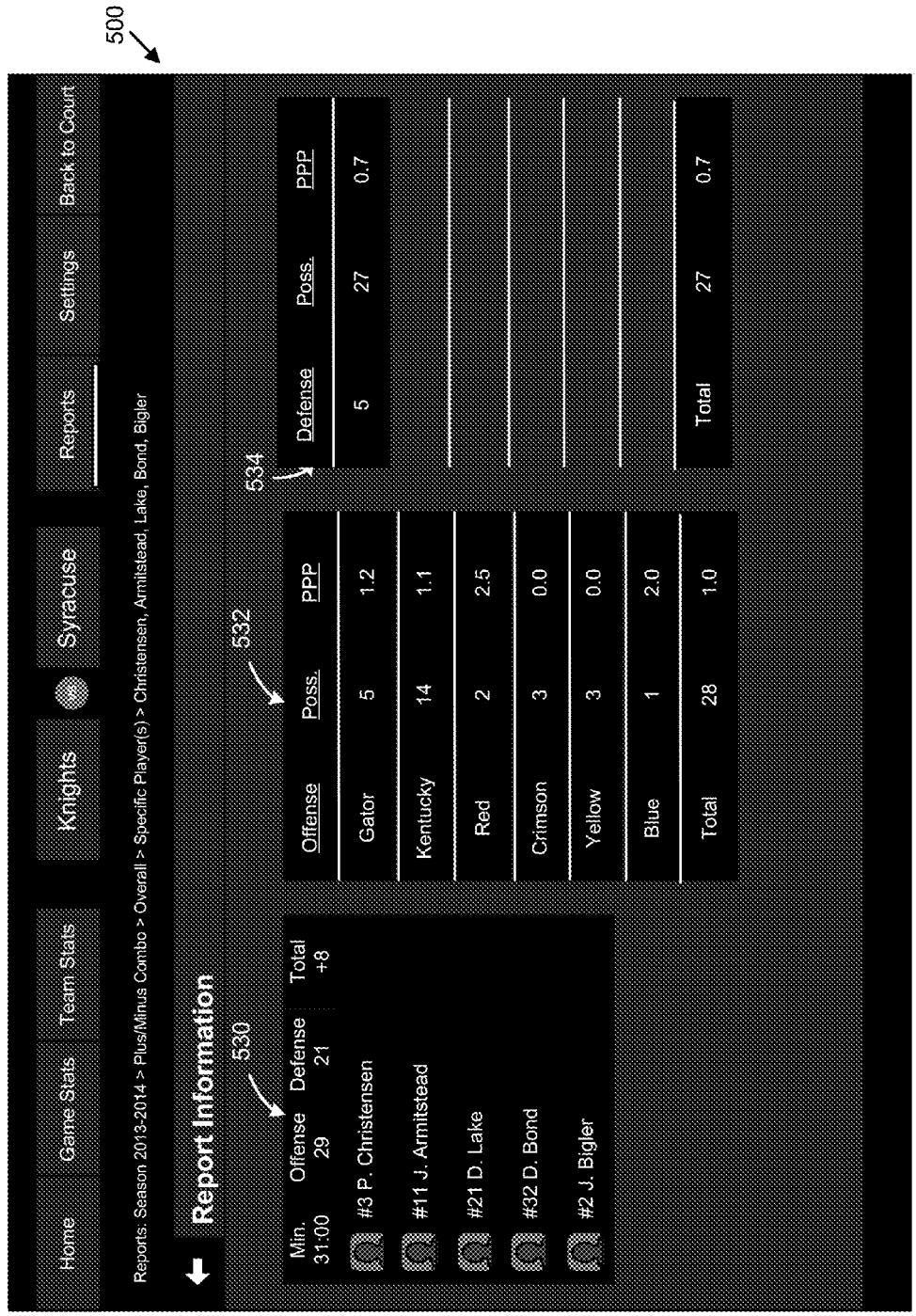

The constructor module 234 determines and commands the interface module 220 to display the best player combination and associated play efficiencies based on the data input 250 from the data entry requests and the group plus/minus efficiency metrics generated by the efficiency module 232. According to one embodiment, the constructor module 234 identifies, and recommends for gameplay, the combination of players that if playing together would have a desirable (e.g., highest) group plus/minus efficiency metric. This identified combination is displayed in a recommended line-up portion 530 of the graphical user interface 500. In some instances, identified combination of players that would have the highest group plus/minus efficiency metric is a combination of players that played together during a game. For example, the recommended line-up portion 530 of the illustrated embodiment of FIG. 14 shows the same line-up that played together in the game as evidenced by the plus/minus efficiency metric 520 of FIG. 13. However, in other instances, the constructor module 234 identifies a new or unique combination of players that did not play or have not played in the game, but would have had the higher group plus/minus efficiency. The recommended or identified combination of players can be helpful in determining future player line-ups during the remainder of a game or for future games.

Additionally, the constructor module 234 may determine and command the interface module 220 to display the efficiencies of various offensive and defensive plays run during the game for a particular recommended line-up. The efficiency metrics may include the number of times a particular offensive or defensive play is run for the recommended line-up during a game as shown in the offensive metric portion 532 of the interface 500, as well as the points per possession (PPP) associated with each play as shown in the defensive metric portion 534 of the interface. Again, the efficiency metrics shown in the offensive and defensive metric portions 532, 534 are associated with the recommended line-up. Accordingly, the efficiency metrics may be the actual metrics of a line-up that played in the game if that line-up was identified as the recommended line-up by the constructor module 234, or the metrics that a recommended line-up that didn't play in the game would have had if they had played together in the game. Based on the foregoing, in some implementations, the constructor module 234 indicates the statistically best player plus/minus combinations running their most efficient offensive and/or defensive plays. According to the foregoing, the constructor module 234 executes the action 318 of recommending an output of the data analysis process 320.

Figure 4:
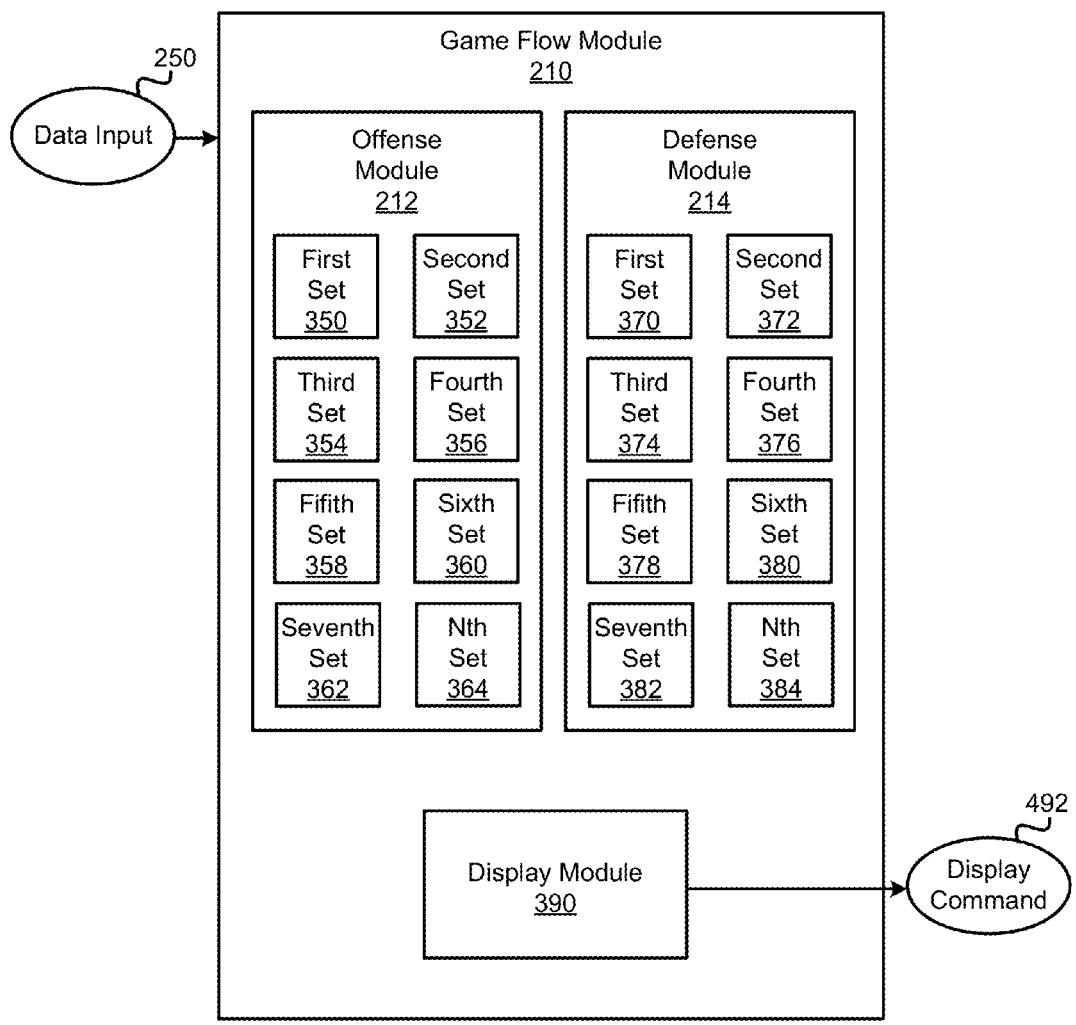
FIG. 4 is a schematic block diagram illustrating one embodiment of a game flow module of a control module.

Referring to FIG. 4, in some embodiments, the offense and defense modules 212, 214 of the game flow module 210 each include a plurality of result set tables. For example, the offense module 212 includes result set tables 350-364, and the defense module 214 includes result set tables 370-384. Each result set table stores a set (e.g., pair or group) of possible results resulting from a given action. The results of each set are grouped together as a set because they represent different results that may result from the same action. The offense and defense modules 212, 214 can include any number of result set tables. In the illustrated embodiment of FIG. 4, the offense module 212 includes seven result set tables (e.g., first through seventh result set tables 350-362) and an Nth result set table indicating that the offense module can include any number of result set tables from one to any number N. Similarly, the defense module 214 includes seven result set tables (e.g., first through seventh result set tables 370-382) and an Nth result set table indicating that the defense module can include any number of result set tables from one to any number N.

Figure 5:
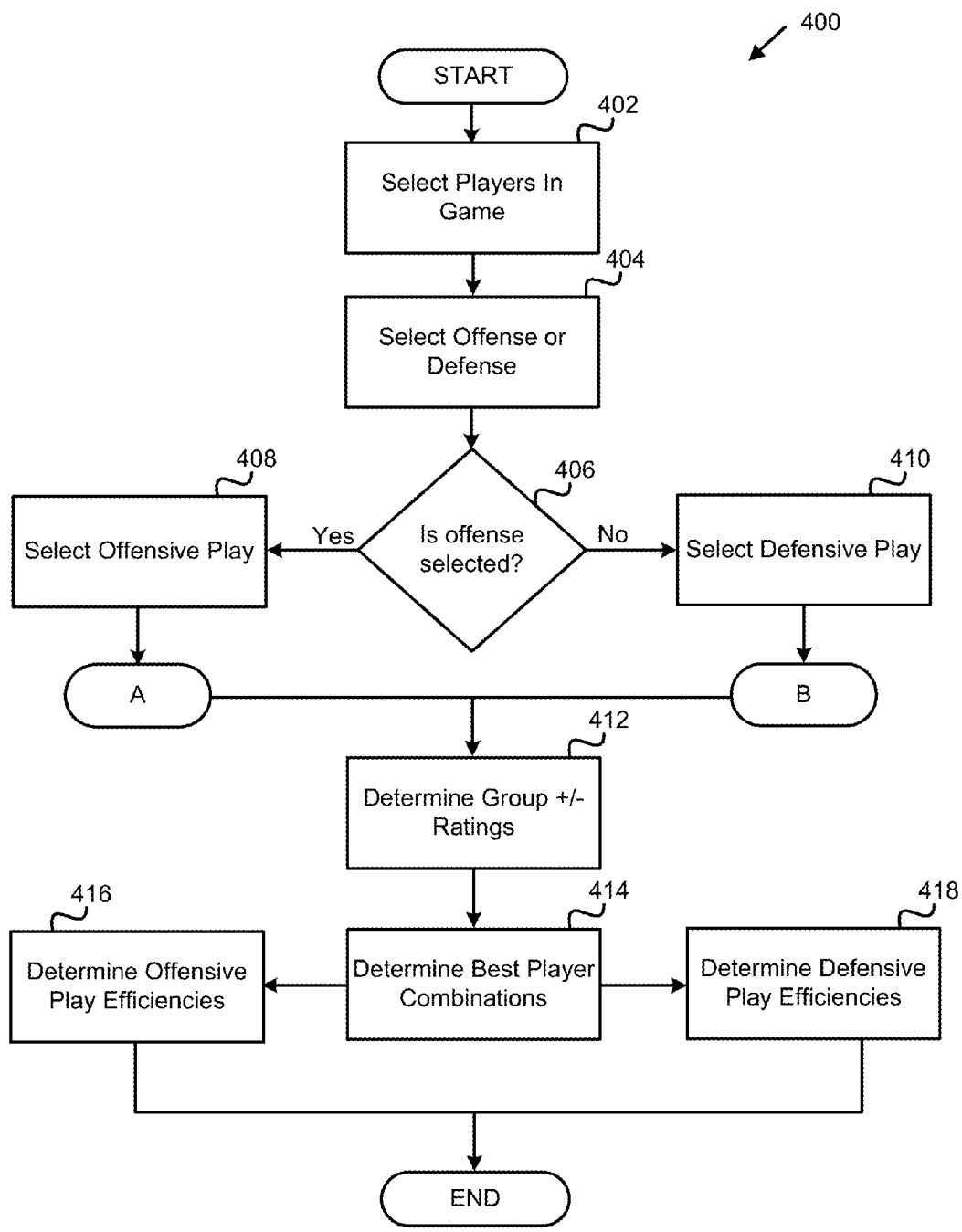
FIG. 5 is a schematic flow diagram illustrating one embodiment of a method for in-game statistics entry and analysis.
Figure 6:
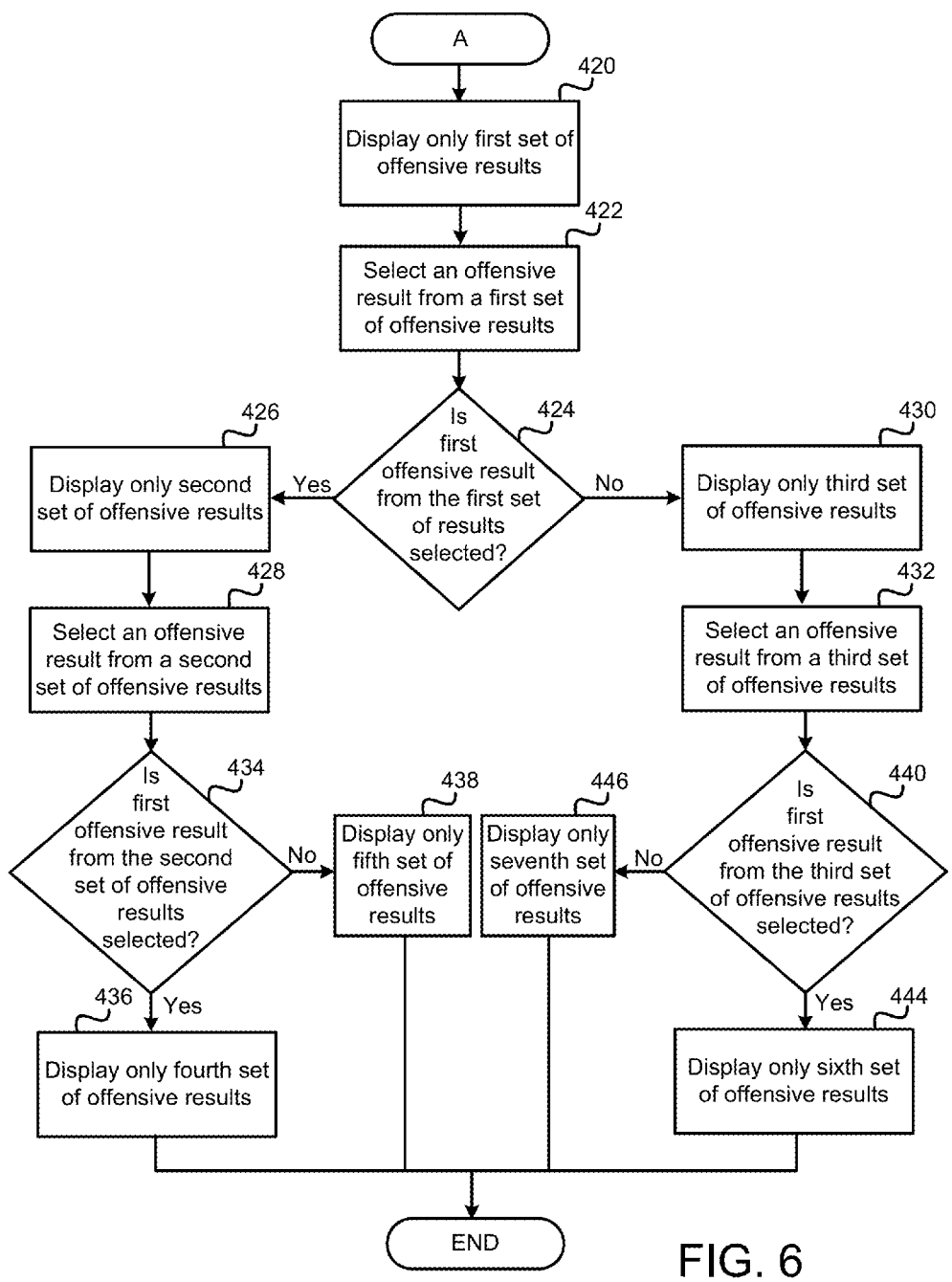
FIG. 6 is a schematic flow diagram illustrating one embodiment of a sub-process of a method for in-game statistics entry and analysis.
Figure 7:
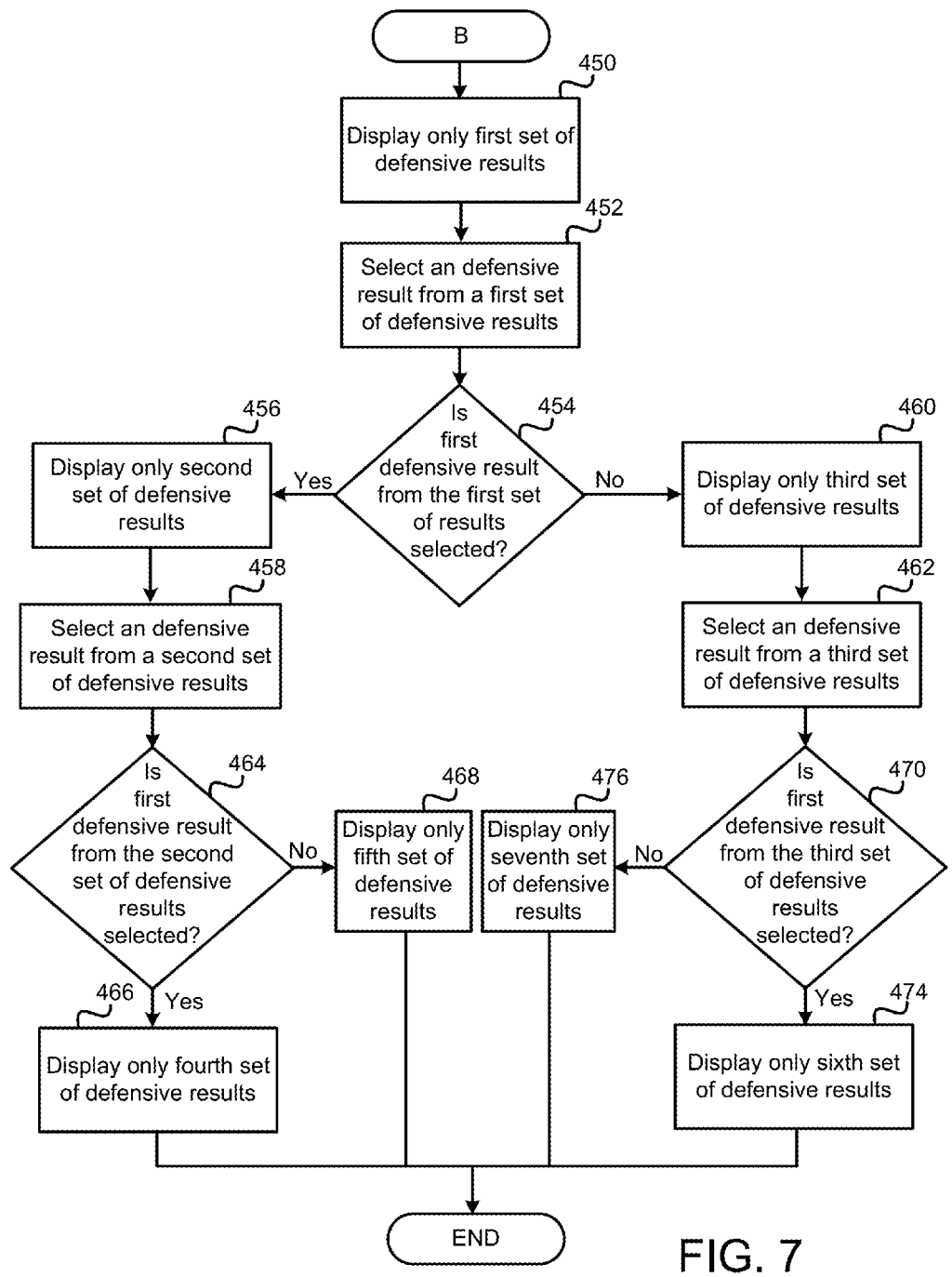
FIG. 7 is a schematic flow diagram illustrating another embodiment of a sub-process of a method for in-game statistics entry and analysis.

The result set tables of the offense and defense module 212, 214 can be used during execution of one embodiment of a method 400 for in-game statistics entry and analysis shown in FIG. 5-7. The method 400 begins by selecting, using a data entry client (e.g., entering into a data entry client), the players that are or will be playing in a game at 402. Then, the method 400 includes selecting, using a data entry client, whether a current possession during the game is an offensive or defensive possession at 404. The method 400 then determines at 406 whether offense or defense was selected at 404. If offense was selected, the method 400 includes selecting, using a data entry client, an offensive play being run or will be ran during the offensive possession at 408. However, if offense was selected, the method 400 includes selecting, using a data entry client, an offensive play being run or will be ran during the offensive possession at 410. The offensive and defensive plays can be selected from a plurality of offensive or defensive plays, respectively, stored in play set tables (not shown) of the respective offense and defense modules 212, 214. After an offensive play is selected at 408, the method 400 proceeds to execute a sub-routine A. Similarly, after a defensive play is selected at 410, the method 400 proceeds to execute a sub-routine B.

Referring to FIG. 6, sub-routine A includes displaying at 420 only a first set of offensive results 420, which can be results stored in the first result set table 350 of the offense module 212. In one implementation, displaying only a set of results means displaying only that set of results (or category of results) and not displaying other sets of results (or other categories of results). The sub-routine A proceeds with selecting, using a data entry client, an offensive result from the first set of offensive results at 422. Then, the sub-routine A determines if a first offensive result from the first set of offensive results was selected at 424. If the first offensive result was selected at 424, the sub-routine A displays at 426 only a second set of offensive results, which can be results stored in the second result set table 352 of the offense module 212. However, if the first offensive result was not selected at 424 (e.g., a second offensive result was selected), the sub-routine A displays at 430 only a third set of offensive results, which can be results stored in the third result set table 354 of the offense module 212.

After only the second set of offensive results is displayed at 426, the sub-routine A proceeds to select, using a data entry client, an offensive result from the second set of offensive results at 428. Then, the sub-routine A determines at 434 if a first offensive result from the second set of offensive results was selected. If the first offensive result was selected at 428, the sub-routine A displays at 436 only a fourth set of offensive results, which can be results stored in the fourth result set table 356 of the offense module 212, and the sub-routine A ends. However, if the first offensive result was not selected at 428 (e.g., a second or another offensive result was selected), the sub-routine A displays at 438 only a fifth set of offensive results, which can be results stored in the fifth result set table 358 of the offense module 212, and the sub-routine A ends.

In contrast, after only the third set of offensive results is displayed at 430, the sub-routine A proceeds to select, using a data entry client, an offensive result from the third set of offensive results at 432. Then, the sub-routine A determines at 440 if a first offensive result from the third set of offensive results was selected. If the first offensive result was selected at 432, the sub-routine A displays at 444 only a sixth set of offensive results, which can be results stored in the sixth result set table 360 of the offense module 212, and the sub-routine A ends. However, if the first offensive result was not selected at 432 (e.g., a second or another offensive result was selected), the sub-routine A displays at 446 only a seventh set of offensive results, which can be results stored in the seventh result set table 362 of the offense module 212, and the sub-routine A ends.

Although the sub-routine A shows a limited number of display and result selection actions, in other embodiments, the sub-routine A can include any number N of display and result selection actions as desired, as long as each action of displaying offensive results includes the data entry client separately and sequentially prompting the user for the selected information. Additionally, as defined above, a first offensive result from one set of offensive results is not referring to a first offensive result from another set of offensive results. In other words, the first offensive result from one set of offensive results typically is not the same as the first offensive result from another set of offensive results. Generally, each sub-routine A continues to show additional display and result actions until given offensive possession is completed. Depending on the results of a possession, the number of display and result selection actions can vary.

FIG. 7 shows the defensive sub-routine B, which includes actions similar to those of the offensive sub-routine A. Accordingly, the description of the sub-routine A applies equally well to the sub-routine B, with the actions 450-474 referencing defense instead of offense.

Referring back to FIG. 5, following the end of either of sub-routines A and B, the method 400 proceeds to determine at 412 group plus/minus efficiency ratings or metrics for each distinct grouping of players that played in a game. Determining the group plus/minus efficiency ratings can be accomplished using the efficiency module 232 of the analysis module 230 as described above. Before or after determining the group plus/minus efficiency ratings at 412, the method 400 determines the best player combination or recommends a line-up at 414. Determining the best player combination at 414 can be accomplished using the constructor module 234 of the analysis module 230 as described above. Additionally, the method 400 determines at 416, 418, respectively, the offensive play efficiencies and defensive play efficiencies for the best player combination determined at 414, and the method ends. Determining the offensive and defensive efficiencies at 416, 418 can be accomplished using the constructor module 234 of the analysis module 230 as described above.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for in-game statistics entry and analysis, comprising:
   selecting, using a handheld electronic device, players that are or will be playing together as groups in an athletic competition;
   selecting, using the handheld device, one of offense or defense;
   selecting, using the handheld device, a play of a plurality of plays associated with the selected one of offense or defense;
   displaying only a first set of results associated with the selected play of the plurality of plays;
   selecting, using the handheld device, a result from the first set of results;
   displaying only a second set of results if the selected result from the first set of results is a first result of the first set of results;
   displaying only a third set of results if the selected result from the first set of results is not a first result of the first set of results;
   determining a group plus/minus efficiency metric for each of the groups that played together in the athletic competition based at least partially on the result selected from the first set of results; and
   determining a combination of players who played in the athletic competition that if grouped together in the athletic competition would have the highest group plus/minus efficiency metric based at least partially on the result selected from the first set of results.

2. The method of claim 1, further comprising determining offensive play efficiencies and defensive play efficiencies for the combination of players who played in the athletic competition that if grouped together in the athletic competition would have the highest group plus-minus efficiency metric.

3. The method of claim 1, wherein the group plus/minus efficiency metric for each of the groups that played together in the athletic competition, and the combination of players who played in the athletic competition that if grouped together in the athletic competition would have the highest group plus/minus efficiency metric based at least partially on the result selected from the first set of results, are determined in real-time during the athletic competition.

4. The method of claim 1, further comprising:
selecting, using the handheld device, a result from the second set of results if the selected result from the first set of results is a first result of the first set of results;
selecting, using the handheld device, a result from the third set of results if the selected result from the first set of results is not a first result of the first set of results;
displaying only a fourth set of results if the selected result from second set of results is a first result of the second set of results;
displaying only a fifth set of results if the selected result from the second set of results is not a first result of the second set of results;
displaying only a sixth set of results if the selected result from third set of results is a first result of the third set of results; and
displaying only a seventh set of results if the selected result from the third set of results is not a first result of the third set of results.

5. The method of claim 1, wherein the first set of results comprises made field goal, missed field goal, blocked field goal, turnover, foul, out of bounds, and possession reset.

* * * * *